H. LENTZ & C. BELLENS.
VALVE GEAR.
APPLICATION FILED JUNE 22, 1907.
921,418.
Patented May 11, 1909.
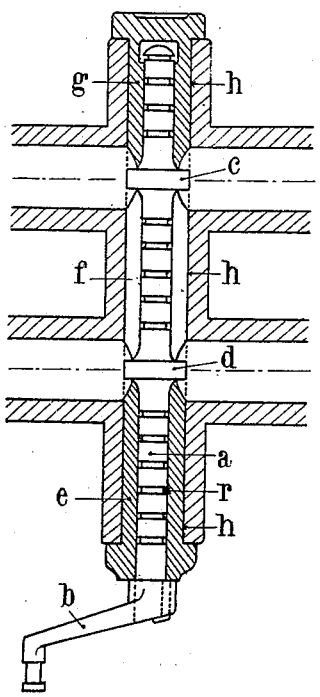
WITNESSES:
W. M. Avery
J. P. Davis
INVENTORS
Hugo Lentz
Charles Bellens
BY
Munn & Co.
ATTORNEYS

UNITED STATES PATENT OFFICE.

HUGO LENTZ, OF HALENSEE, NEAR BERLIN, GERMANY, AND CHARLES BELLENS, OF NEUILLY, FRANCE.

VALVE-GEAR.

No. 921,418.　　　　Specification of Letters Patent.　　　　Patented May 11, 1909.

Application filed June 22, 1907.　Serial No. 380,278.

*To all whom it may concern:*

Be it known that we, HUGO LENTZ, a subject of the Emperor of Germany, and resident of 123 Kurfürstendamm, at Halensee, near Berlin, Germany, engineer, and CHARLES BELLENS, a subject of the King of England, and resident of 43 Rue de Chézy, at Neuilly Seine, France, engineer, have invented certain new and useful Improvements in Valve-Operating Gears, of which the following is a specification.

This invention relates to valve mechanism for steam engines in which the valves are operated by a cam shaft, and it is characterized particularly by the fact that the cam shaft is located in a fixed casing, formed with sockets having an external diameter equal to or slightly greater than the largest diameter of the cams to allow of the passage of the same, to the end that by fitting and introducing the cam shaft into a tubular sleeve or envelop it is rendered oil, steam and dust tight, without the assistance of stuffing boxes or similar devices.

A constructional form of the object of the invention is illustrated by way of example in the accompanying drawing.

The cam shaft $a$ provided at one of its extremities with an operating member $b$, such for example as a crank wheel or toothed sector, is lodged inside an envelop or casing consisting of three sockets $e, f, g$, of the same external diameter and fitted with a tight joint into a tubular sleeve $h$ in the valve chest. The shaft $a$ is received by the casing throughout its entire length except where the cams project. This casing has an external diameter equal to or preferably slightly larger than that of the largest diameter of the cams, in order that the shaft, the cams and the casing may be introduced into the sleeve $h$. For facilitating mounting, the socket $f$ comprised between the cams $c$ and $d$ is preferably made in two parts separated by a diametral plane, and when the cams are formed integral with the cam shaft this is absolutely necessary. The cam shaft $a$ may comprise grooves $r$ for the lubricant.

This arrangement presents the advantage of being perfectly steam and oil tight without the employment of stuffing boxes or similar devices, and moreover protects the operating members from dust owing to the large bearing surfaces situated both between the shaft and its casing and between the latter and its sleeve. Another advantage consists in the simplicity of the construction and the ease with which the valve gear may be assembled.

It will, of course, be understood that the number of sockets on the casing will vary in accordance with the number of cams on the cam shaft, that is to say, according to the type of machine to which the invention is applied.

The casing may be held in position by any suitable means, such as screws, keys or other parts, and it may be other than circular in cross section. The sockets are not necessarily of the same diameter and the cam shaft may, of course, be operated by any appropriate operating means, such as a plate, lever, crank or the like.

Having now particularly described and ascertained the nature of our said invention and in what manner the same is to be performed, we declare that what we claim is:—

1. In a valve operating gear, a shaft provided with a plurality of cams, operating means for the shaft, a tubular casing whose interior diameter is slightly larger than the largest diameter of the cams, and sockets surrounding the shaft and fitted tightly in said tubular casing.

2. In a valve operating gear, a shaft provided with a plurality of cams, operating means for the shaft, a tubular casing, and sockets surrounding the shaft and fitted tightly in said tubular casing, the socket between two cams being made in two parts which are separable in an axial plane.

3. In a valve operating gear, a shaft provided with a plurality of cams and with grooves for the lubricant, operating means for the shaft, a tubular casing, and sockets surrounding the shaft and fitted tightly in said tubular casing.

In testimony whereof we have hereunto placed our hands at Berlin this 1st day of June 1907, and at Paris, this 8th day of June 1907.

HUGO LENTZ.
CHARLES BELLENS.

Witnesses as to the signature of Hugo Lentz:
WOLDEMAR HAUPT,
HENRY HASPER.

Witnesses as to the signature of Charles Bellens:
DEAN B. MASON,
HENRY SCHWAB.